(12) United States Patent
Kwon

(10) Patent No.: US 8,998,258 B2
(45) Date of Patent: Apr. 7, 2015

(54) STEERING APPARATUS FOR VEHICLE

(71) Applicant: Mando Corporation, Pyeongtaek-si, Gyeonggi-do (KR)

(72) Inventor: Hyun Bi Kwon, Yongin-si (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/266,928

(22) Filed: May 1, 2014

(65) Prior Publication Data

US 2014/0327235 A1    Nov. 6, 2014

(30) Foreign Application Priority Data

May 2, 2013  (KR) .......................... 10-2013-0049491

(51) Int. Cl.
  *B62D 1/19*    (2006.01)

(52) U.S. Cl.
  CPC ...................................... *B62D 1/195* (2013.01)

(58) Field of Classification Search
  CPC ...................................................... B62D 1/195
  USPC ......................................................... 280/777
  See application file for complete search history.

(56) References Cited

U.S. PATENT DOCUMENTS

| | | | |
|---|---|---|---|
| 6,170,873 B1 * | 1/2001 | Jurik et al. | 280/777 |
| 6,450,532 B1 * | 9/2002 | Ryne et al. | 280/777 |
| 7,264,274 B2 * | 9/2007 | Ridgway et al. | 280/777 |
| 8,562,020 B2 * | 10/2013 | Arakawa et al. | 280/777 |
| 8,651,526 B2 * | 2/2014 | Nakamura et al. | 280/777 |
| 2011/0227323 A1 * | 9/2011 | Osuka et al. | 280/779 |
| 2012/0112443 A1 * | 5/2012 | Arakawa et al. | 280/777 |

FOREIGN PATENT DOCUMENTS

| | | |
|---|---|---|
| JP | 2006199180 A | 8/2006 |
| KR | 1020060101626 A | 9/2006 |
| KR | 1020070023304 A | 2/2007 |
| KR | 1020070074413 A | 7/2007 |
| KR | 1020080084010 A | 9/2008 |

OTHER PUBLICATIONS

Korean official action dated Jun. 16, 2014 of the corresponding Korean Application No. 10-2013-0049491.
Korean Notice of Allowance for application No. 10-2013-0049491 dated Jan. 26, 2015.

* cited by examiner

*Primary Examiner* — Drew Brown
(74) *Attorney, Agent, or Firm* — Lowe Hauptman & Ham, LLP

(57) ABSTRACT

Provided is a steering apparatus for a vehicle including a steering column, a mounting bracket laterally installed at the steering column and having a pair of through-holes formed at each of both sides and spaced apart from each other, a guide block including a base section and a pair of guide sections extending upward from the base section and spaced apart from each other to be inserted into the through-holes, and a capsule including a fixing section fixed to the mounting bracket and configured to be separated from the mounting bracket upon a collision of a vehicle, and a slide section lengthily extending from the fixing section and slidably inserted between the pair of guide sections.

7 Claims, 9 Drawing Sheets

STEERING APPARATUS FOR VEHICLE

CROSS REFERENCE TO RELATED APPLICATION

This application claims priority of Korean Patent Application No. 10-2013-0049491, filed on May 2, 2013, in the Korean Intellectual Property Office, the contents of which are incorporated herein by reference in its entirety.

BACKGROUND

1. Field of the Invention

The present invention relates to a steering apparatus for a vehicle, and more particularly, to a steering apparatus for a vehicle configured to guarantee straight movement of a steering column upon a collision of a vehicle to improve safety.

2. Discussion of Related Art

In general, in recent times, in order to prevent a driver from colliding with a wheel and being injured upon a traffic accident, a steering apparatus for a vehicle has a shock absorbing structure that can be slid rearward when a shock is transmitted to the vehicle.

Accordingly, a capsule configured to fix a mounting bracket to a vehicle body is configured to release the fixed state to be separated therefrom, and thus, a steering column can be separated from the vehicle body to be moved rearward.

Here, since the conventional capsule often functions to simply fix the mounting bracket to the vehicle body, the steering column may be laterally shaken upon the rearward movement according to the collision of the vehicle. This may cause a secondary injury to a driver to decrease probability of survival of the driver.

While methods for improving the above-mentioned technology have been researched, since the technologies developed up to now do not have a strong structure sufficient to endure an external force generated upon a collision of a vehicle, lateral shaking of the steering column cannot be prevented.

Accordingly, a method of solving the above-mentioned problems is needed.

CITATION LIST

Patent Literature (Patent Literature 1) Korean Patent Laid-open Publication No. 10-2008-0084010

SUMMARY OF THE INVENTION

The present invention is directed to provide a steering apparatus for a vehicle capable of guaranteeing straight movement of a steering column to improve safety.

The aspects of the invention are not limited thereto but the other non-described aspects and features will be apparent to those skilled in the art from the following description.

A steering apparatus for a vehicle according to an aspect of the present invention includes a steering column, a mounting bracket laterally installed at the steering column and having a pair of through-holes formed at each of both sides and spaced apart from each other, a guide block including a base section and a pair of guide sections extending upward from the base section and spaced apart from each other to be inserted into the through-holes, and a capsule including a fixing section fixed to the mounting bracket and configured to be separated from the mounting bracket upon a collision of a vehicle, and a slide section lengthily extending from the fixing section and slidably inserted between the pair of guide sections.

In addition, the guide block may further include extension sections extending upward from the guide section to face each other and preventing separation of the slide section.

Further, the extension section may be formed to connect upper ends of the pair of guide sections to close an upper surface of the guide block.

Furthermore, wherein an inner side of the extension section may be formed in a curved shape.

In addition, a steering apparatus for a vehicle according to another aspect of the present invention includes a steering column, a mounting bracket laterally installed at the steering column and having a pair of bending sections formed at each of both sides, spaced apart from each other, and extending upward, and a capsule including a fixing section fixed to the mounting bracket and configured to be separated from the mounting bracket upon a collision of a vehicle, and a slide section lengthily extending from the fixing section and slidably inserted between the pair of bending sections.

Further, the bending section may be bent upward from a cutting line formed around the mounting bracket except a portion connected thereto.

Furthermore, the bending section may include a dual bending section laterally bent at an upper end of the bending section to prevent separation of the slide section.

The steering apparatus for the vehicle according to the present invention can guarantee straight movement of the steering column upon a collision of the vehicle to remarkably improve safety.

In addition, the extension section can be formed at the capsule to guide straight movement throughout the entire moving range of the steering column.

Further, the guide block may have various shapes so that an appropriate shape can be selected according to the vehicle.

Furthermore, when the bending section is formed at the mounting bracket, a material can be saved to decrease manufacturing costs.

The effects of the present invention are not limited to the above-mentioned effects, and the other additional effects will become apparent to those skilled in the art from the following description.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, a steering apparatus for a vehicle according to the present invention will be described in detail with reference to the accompanying drawings.

Figure 1:
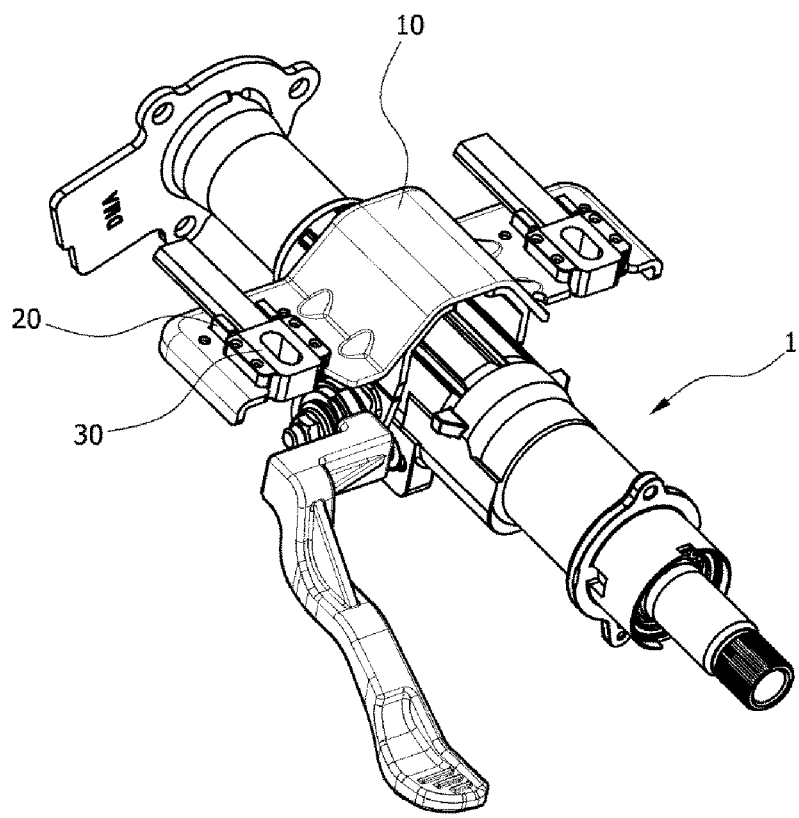
FIG. 1 is a perspective view showing the entire appearance of a steering apparatus for a vehicle according to a first embodiment of the present invention.
Figure 2:
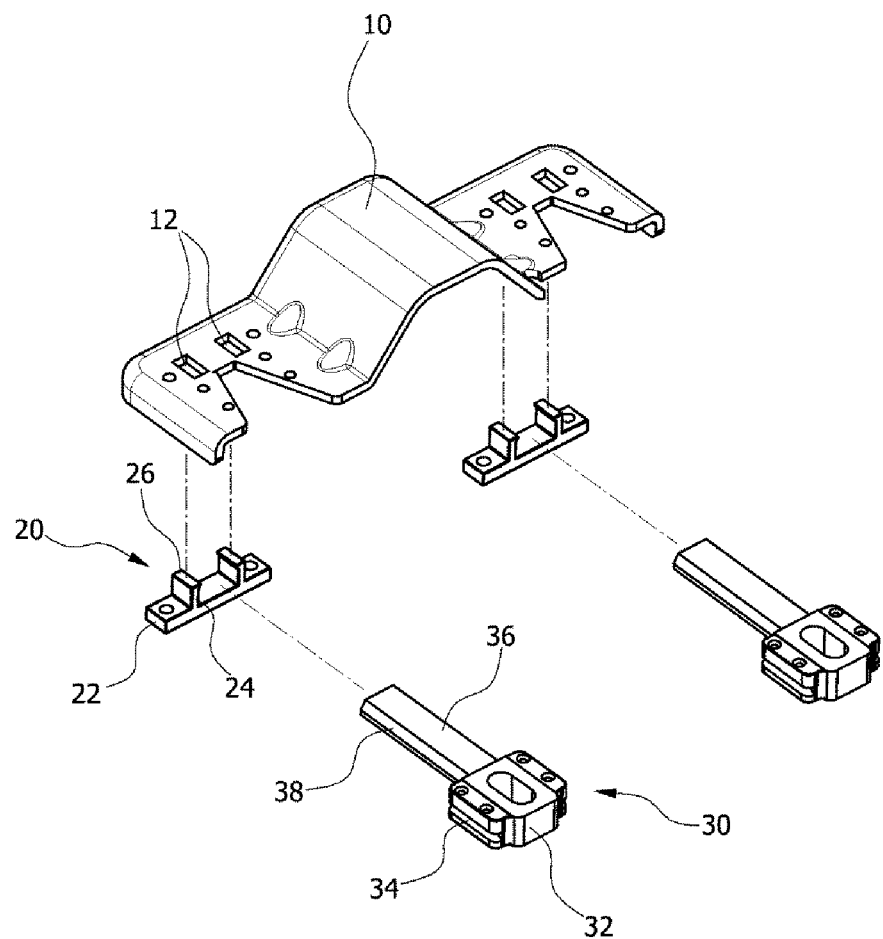
FIG. 2 is a perspective view showing a case in which a guide block and a capsule are coupled to a mounting bracket in the steering apparatus for the vehicle according to the first embodiment of the present invention.

FIG. 1 is a perspective view showing the entire appearance of a steering apparatus for a vehicle according to a first embodiment of the present invention, and FIG. 2 is a perspective view showing a case in which a guide block 20 and a capsule 30 are coupled to a mounting bracket 10 in the steering apparatus for the vehicle according to the first embodiment of the present invention.

As shown in FIGS. 1 and 2, the steering apparatus for the vehicle according to the first embodiment of the present invention includes a steering column 1, the mounting bracket 10, the guide block 20, and the capsule 30.

The steering column 1 is connected to a steering wheel of a vehicle to steer the vehicle.

In addition, the mounting bracket 10 is laterally installed at the steering column 1 to fix the steering column 1 to the vehicle body, and has a pair of through-holes 12 formed at each of both sides and spaced apart from each other.

The guide block 20 includes a base section 22 and a pair of guide sections 24 extending upward from the base section 22 to be inserted into the through-holes 12 and spaced apart from each other. That is, the guide sections 24 can be inserted into the through-holes 12, respectively, and the base section 22 is in contact with a lower surface of the mounting bracket 10.

The capsule 30 includes a fixing section 32 fixed to the mounting bracket 10 and configured to be separated from the mounting bracket 10 upon a collision of the vehicle, and a slide section 36 lengthily extending from the fixing section 32 and slidably inserted between the pair of guide sections 24. That is, the slide section 36 of the capsule 30 can slide along a straight path between the guide sections 24.

In addition, in the embodiment, insertion grooves 34 into which the mounting bracket 10 is to be inserted are formed at both sides of the fixing section 32, and guide grooves 38 corresponding to extension sections 26 protruding from an upper surface of the guide section 24 to face each other are formed at both sides of the slide section 36.

Figure 3:
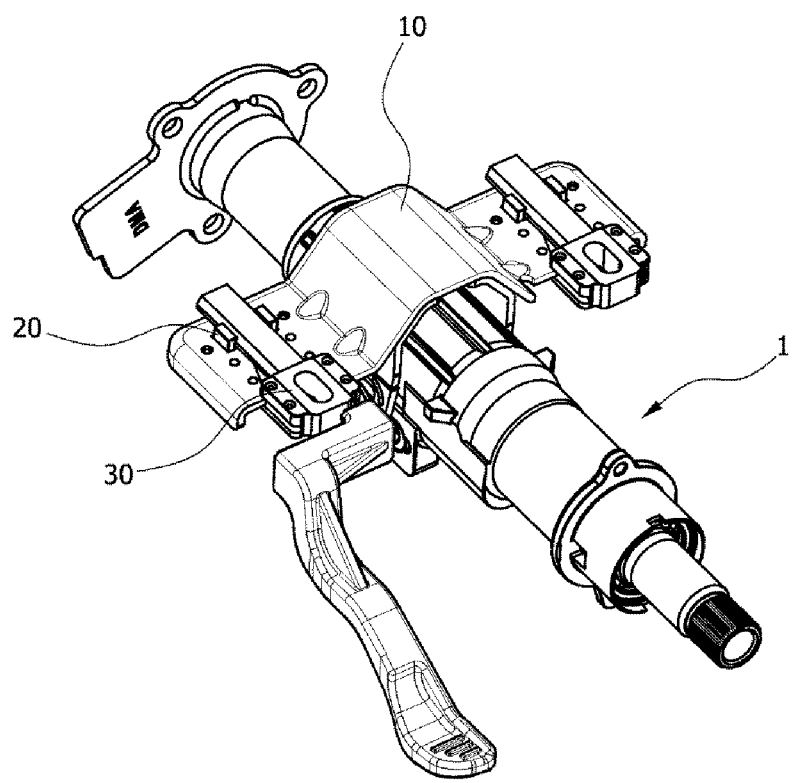
FIG. 3 is a perspective view showing a case in which the capsule is separated from the mounting bracket and a steering column is moved rearward upon a collision of a vehicle in the steering apparatus for the vehicle according to the first embodiment of the present invention.
Figure 4:
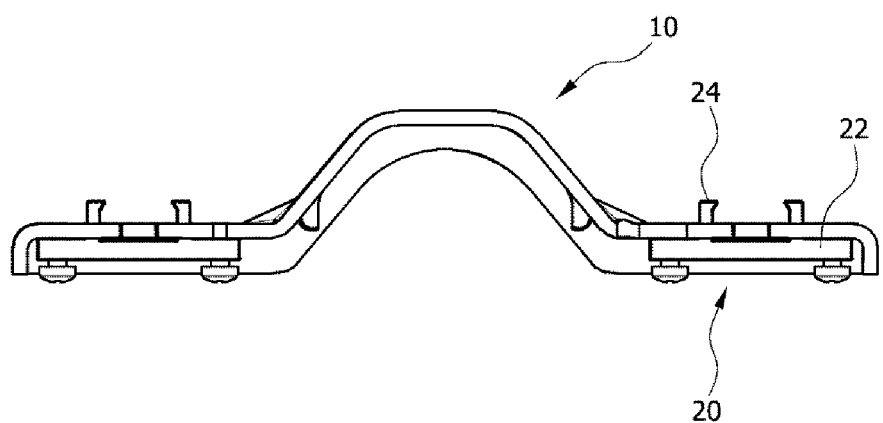
FIG. 4 is a cross-sectional view showing a case in which a guide block is coupled to the mounting bracket in the steering apparatus for the vehicle according to the first embodiment of the present invention.

As shown in FIGS. 3 and 4, when the collision of the vehicle occurs, the fixing section 32 of the capsule 30 is separated from the mounting bracket 10, and thus, the steering column 1 and the mounting bracket 10 are moved rearward to prevent an injury of a driver.

Here, since the slide section 36 of the capsule 30 moves straightly without a lateral separation along the guide section 24 of the guide block 20, a secondary injury to the driver due to the shaking of the steering column 1 can be prevented to improve safety.

Hereinafter, modifications of the guide block 20 and the capsule 30 according to the embodiments will be described.

Figure 5:
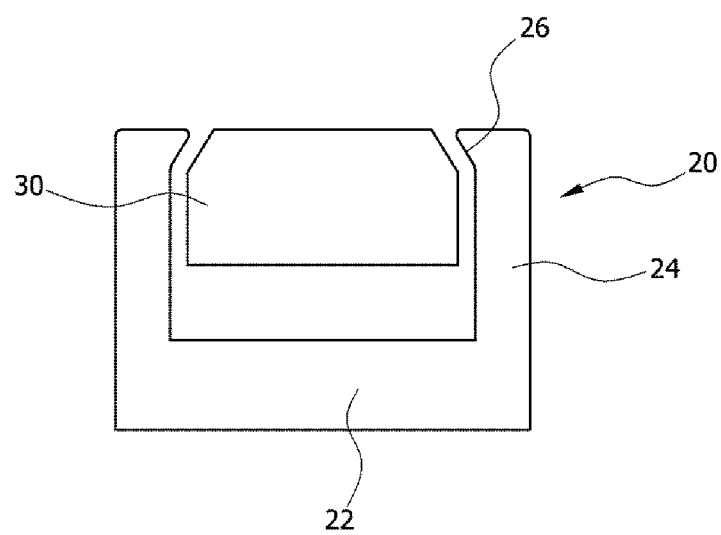
FIG. 5 is a cross-sectional view of the guide block and the capsule in the steering apparatus for the vehicle according to the first embodiment of the present invention.

FIG. 5 is a cross-sectional view of the guide block 20 and the capsule 30 in the steering apparatus for the vehicle according to the first embodiment of the present invention.

As shown in FIG. 5, in the case of the embodiment, the guide block 20 further includes the extension sections 26 extending upward from the pair of guide sections 24 to face each other and preventing separation of the slide section 36 of the capsule 30. Accordingly, the capsule 30 is not separated upward even upon the collision of the vehicle to further improve the safety.

Figure 6:
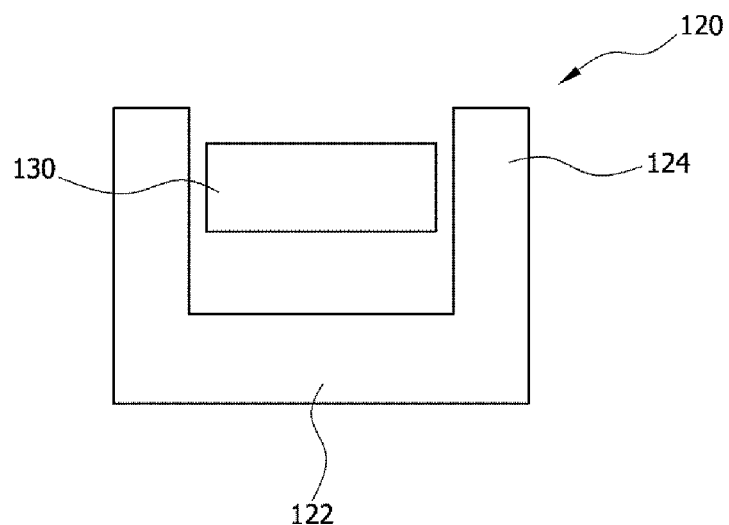
FIG. 6 is a cross-sectional view of a guide block and a capsule in a steering apparatus for a vehicle according to a second embodiment of the present invention.

FIG. 6 is a cross-sectional view of a guide block 120 and a capsule 130 in a steering apparatus for a vehicle according to a second embodiment of the present invention.

As shown in FIG. 6, in the case of the embodiment, it will be appreciated that an extension section is not formed at a guide section 124 unlike the above-mentioned first embodiment. As described above, the extension section may be omitted according to an internal structure or a circumstance of the vehicle.

Figure 7:
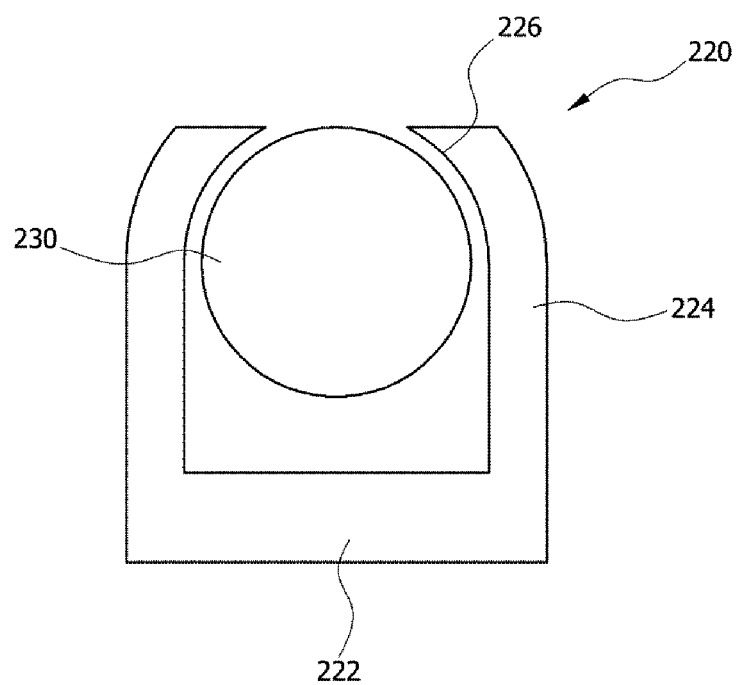
FIG. 7 is a cross-sectional view of a guide block and a capsule in a steering apparatus for a vehicle according to a third embodiment of the present invention.

FIG. 7 is a cross-sectional view of a guide block 220 and a capsule 230 in a steering apparatus for a vehicle according to a third embodiment of the present invention.

As shown in FIG. 7, in the embodiment, the capsule 230 has a circular cross-section, and an extension section 226 has a curved inner surface. As described above, the capsule 230 and the guide block 220 may be formed in various shapes, and in the case of the shape in the embodiment, a frictional force between the capsule 230 and the guide block 220 can be reduced to enable smooth sliding.

Figure 8:
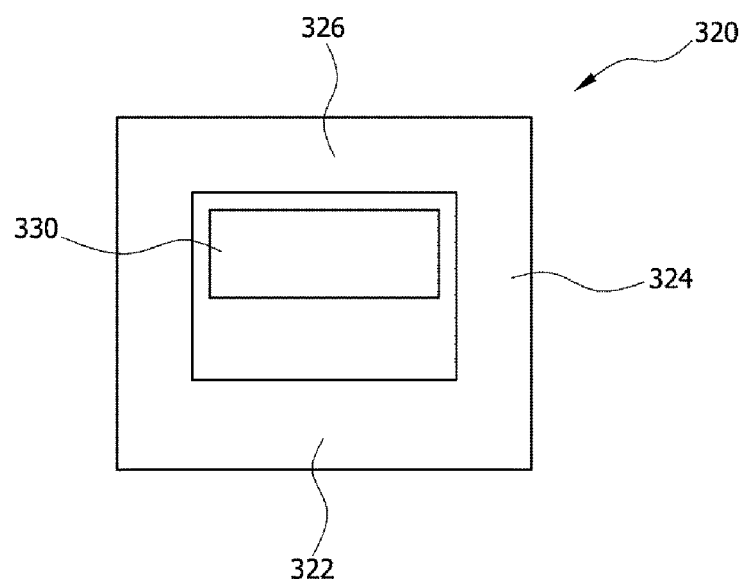
FIG. 8 is a cross-sectional view of a guide block and a capsule in a steering apparatus for a vehicle according to a fourth embodiment of the present invention.

FIG. 8 is a cross-sectional view of a guide block 320 and a capsule 330 in a steering apparatus for a vehicle according to a fourth embodiment of the present invention.

As shown in FIG. 8, in the case of the embodiment, an extension section 326 is formed to connect upper ends of a pair of guide sections 324 to close an upper surface of the guide block 320. In this case, separation of the capsule 330 can be completely prevented from being separated to remarkably improve safety.

Figure 9:
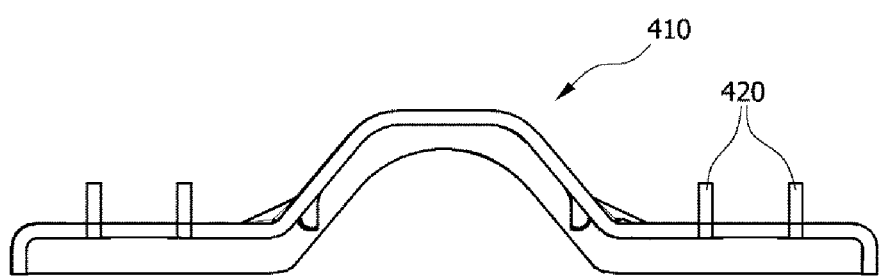
FIG. 9 is a cross-sectional view showing a case in which a capsule is coupled to a bending section of a mounting bracket in a steering apparatus for a vehicle according to a fifth embodiment of the present invention.

FIG. 9 is a cross-sectional view showing a case in which a capsule is coupled to a bending section of a mounting bracket in a steering apparatus for a vehicle according to a fifth embodiment of the present invention.

According to another aspect, the steering apparatus for the vehicle according to the present invention as shown in FIG. 9 may not include a guide block installed in each of the above-mentioned embodiments.

In this case, bending sections 420 may be formed at a mounting bracket 410. The bending section 420 is formed by an upward extending portion of the mounting bracket 410, and can function as the guide block installed at each of the embodiments.

The bending section 420 of the embodiment is formed by forming a cutting line around the mounting bracket (410) except a portion connected thereto and upwardly bending the cut portion. Specifically, the cutting line is formed in a substantially rectangular shape, and the bending section 420 may be bent upward in a state connected to the mounting bracket 410 in a shape in which one corner is not cut.

While not shown, the bending sections 420 may further include dual bending sections, which are additionally bent at upper ends of the bending sections 420 in leftward and rightward directions, to prevent separation of the slide section of the capsule. That is, the dual bending section may function as the extension section of the guide block.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A steering apparatus for a vehicle comprising:
   a steering column;
   a mounting bracket and having a pair of through-holes respectively formed at both lateral sides of the mounting bracket and spaced apart from each other, and fixing the steering column to the vehicle body;
   a guide block installed at the both lateral sides of the mounting bracket, and comprising a base section installed to the lower side of the mounting bracket and a pair of guide sections extending upward from the base section, spaced apart from each other to be inserted into the through-holes; and
   a capsule installed at the both lateral sides of the mounting bracket, and comprising a fixing section fixed to the mounting bracket and configured to be separated from the mounting bracket upon a collision of a vehicle, and a slide section lengthily extending from the fixing section and slidably inserted along a straight path between the pair of guide sections.

2. The steering apparatus for the vehicle according to claim 1, wherein the guide block further comprises extension sections extending upward from the guide section to face each other and preventing separation of the slide section.

3. The steering apparatus for the vehicle according to claim 2, wherein an inner side of the extension section is formed in a curved shape.

4. The steering apparatus for the vehicle according to claim 2, wherein the extension sections are formed to connect upper ends of the guide sections to close an upper surface of the guide block leaving no space between the upper ends of the guide sections.

5. A steering apparatus for a vehicle comprising:
   a steering column;
   a mounting bracket fixing the steering column to the vehicle body and having a pair of bending sections respectively formed at both lateral sides of the mounting bracket, wherein the pair of bending sections are spaced apart from each other and extend upward from the mounting bracket; and
   a capsule installed at the both lateral sides of the mounting bracket, and comprising a fixing section fixed to the mounting bracket and configured to be separated from the mounting bracket upon a collision of a vehicle, and a slide section lengthily extending from the fixing section and slidably inserted along a straight path between the pair of bending sections.

6. The steering apparatus for the vehicle according to claim 5, wherein the bending section is bent upward from a cutting line formed around the mounting bracket except a portion connected thereto.

7. The steering apparatus for the vehicle according to claim 6, wherein the bending section comprises a dual bending section laterally bent at an upper end of the bending section to prevent separation of the slide section.

\* \* \* \* \*